(12) United States Patent
Mercier

(10) Patent No.: US 9,738,391 B2
(45) Date of Patent: Aug. 22, 2017

(54) ENGINE INSTALLATION SYSTEM

(71) Applicant: United Technologies Corporation, Hartford, CT (US)

(72) Inventor: Claude Mercier, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 653 days.

(21) Appl. No.: 14/202,688

(22) Filed: Mar. 10, 2014

(65) Prior Publication Data

US 2015/0251774 A1    Sep. 10, 2015

(51) Int. Cl.
  *B64F 5/00* (2017.01)
  *B64D 27/26* (2006.01)
  *F01D 25/28* (2006.01)
  *B64F 5/50* (2017.01)

(52) U.S. Cl.
  CPC ............... *B64D 27/26* (2013.01); *B64F 5/50* (2017.01); *F01D 25/285* (2013.01); *Y10T 29/53961* (2015.01)

(58) Field of Classification Search
  CPC .. B64F 5/50; B64F 5/0036; B64F 5/10; B64F 5/40; B64F 5/0009; B64F 5/0081; B64D 27/26; F01D 25/285; Y10T 29/53961; A64D 27/26
  USPC .............. 72/450, 451; 74/38, 106, 520, 585; 29/281.1, 24.358; 100/280; 410/46, 47; 244/54; 414/589; 172/588, 595
  See application file for complete search history.

(56) References Cited

U.S. PATENT DOCUMENTS

| | | | | | |
|---|---|---|---|---|---|
| 1,409,218 | A | * | 3/1922 | Krotz | A01B 21/083 172/588 |
| 1,421,047 | A | * | 6/1922 | Ward | A01B 21/083 172/588 |
| 1,457,280 | A | * | 5/1923 | Griffith | A01B 21/083 172/588 |
| 1,472,515 | A | * | 10/1923 | Dickinson | A01B 23/046 172/588 |
| 1,475,810 | A | * | 11/1923 | Frisz | B25B 27/023 29/261 |
| 1,476,512 | A | * | 12/1923 | Heston | A01B 21/08 172/588 |
| 1,543,622 | A | * | 6/1925 | Sharp | A01B 21/083 172/588 |
| 1,620,066 | A | * | 3/1927 | Brenneis | A01B 21/08 172/588 |
| 1,621,622 | A | * | 3/1927 | Brenneis | A01B 21/08 172/588 |
| 1,649,336 | A | * | 11/1927 | Brenneis | A01B 21/00 172/588 |
| 1,829,342 | A | * | 10/1931 | Dewend | A01B 21/08 172/588 |

(Continued)

Primary Examiner — Larry E Waggle, Jr.
Assistant Examiner — Mahdi H Nejad
(74) Attorney, Agent, or Firm — Kinney & Lange, P.A.

(57) ABSTRACT

An engine installation system includes two aftward members and two forward members. Each member is connected to a different bootstrap on one end and has a pivotable connection to a pylon on the other end. There is a link that connects one forward member with one aftward member, and another link that connects the other forward member with the other aftward member. There is a variable-length member connected to the bootstrap-end of each of the two aftward members, with each of the variable-length members having a pivotable connection to the pylon.

17 Claims, 4 Drawing Sheets

(56) References Cited

U.S. PATENT DOCUMENTS

| | | | | |
|---|---|---|---|---|
| 2,048,109 A | * | 7/1936 | Henry | A01B 21/083 172/588 |
| 2,113,832 A | * | 4/1938 | Vern | A01B 21/08 172/581 |
| 2,163,818 A | * | 6/1939 | White | A01B 21/08 172/583 |
| 2,380,298 A | * | 7/1945 | Dyrr | A01B 21/08 172/588 |
| 2,584,238 A | * | 2/1952 | Sonneman | A01B 21/08 172/588 |
| 2,694,889 A | * | 11/1954 | McKechnie | A01B 21/08 172/588 |
| 2,815,184 A | * | 12/1957 | Irwin | B64D 27/26 244/54 |
| 2,896,909 A | * | 7/1959 | Taylor | B60P 1/025 254/134 |
| 3,057,032 A | * | 10/1962 | Harding | G01N 3/04 29/34 R |
| 3,236,556 A | * | 2/1966 | Lathers | B60N 2/045 248/421 |
| 3,292,716 A | * | 12/1966 | Youngberg | A01B 21/083 172/595 |
| 3,314,672 A | * | 4/1967 | Gote | B60N 2/502 248/575 |
| 3,432,911 A | * | 3/1969 | Rodgers | B64F 5/50 29/281.1 |
| 3,730,280 A | * | 5/1973 | Oelschlaeger | A01B 73/062 172/581 |
| 3,935,725 A | * | 2/1976 | Reischl | B21D 1/14 72/451 |
| 4,180,135 A | * | 12/1979 | Birkenbach | A01B 21/083 172/398 |
| 4,236,859 A | | 12/1980 | Stearn et al. | |
| 4,412,774 A | * | 11/1983 | Legrand | B64F 5/50 180/298 |
| 4,440,265 A | * | 4/1984 | Spagnoli | B64F 5/50 182/129 |
| 4,461,455 A | * | 7/1984 | Mills | B64F 5/50 180/125 |
| 4,580,437 A | * | 4/1986 | Laviano | B21D 5/02 72/389.3 |
| 4,660,796 A | | 4/1987 | Garrec | |
| 5,383,652 A | * | 1/1995 | Van Den Berg | B25H 1/0007 269/17 |
| 5,722,512 A | * | 3/1998 | Lilja | B64F 5/50 187/244 |
| 5,784,919 A | * | 7/1998 | Mattsson | B21D 39/021 100/271 |
| 5,816,367 A | * | 10/1998 | Lilja | F01D 25/285 187/244 |
| 5,819,386 A | * | 10/1998 | Koppe | B25B 27/023 29/261 |
| 6,170,141 B1 | * | 1/2001 | Rossway | F01D 25/285 206/319 |
| 6,485,247 B1 | * | 11/2002 | Groves | B64F 5/50 180/125 |
| 6,619,620 B1 | | 9/2003 | Carter | |
| 7,103,952 B2 | * | 9/2006 | Appleton | F01D 25/285 244/54 |
| 7,770,292 B2 | * | 8/2010 | Stretton | B66C 1/10 269/17 |
| 7,941,905 B2 | * | 5/2011 | Garland | B64F 5/0081 244/54 |
| 7,963,542 B2 | * | 6/2011 | Doll | B62D 63/061 280/404 |
| 8,191,823 B2 | * | 6/2012 | Guering | B64C 15/12 244/54 |
| 8,240,600 B2 | | 8/2012 | Balk | |
| 8,720,059 B2 | * | 5/2014 | West | F01D 25/285 248/544 |
| 8,727,269 B2 | * | 5/2014 | Stuart | F02C 7/20 244/53 R |
| 8,833,776 B2 | * | 9/2014 | Boulanger | B64F 5/0036 280/35 |
| 8,851,441 B2 | * | 10/2014 | Acuna | F16M 3/00 206/319 |
| 9,249,733 B2 | * | 2/2016 | Hallam | F01D 25/285 |
| 2006/0185342 A1 | * | 8/2006 | Hruska | A01D 78/146 56/378 |
| 2008/0251633 A1 | * | 10/2008 | Journade | B64D 27/26 244/54 |
| 2009/0084893 A1 | * | 4/2009 | Balk | B64D 27/26 244/54 |
| 2009/0145098 A1 | * | 6/2009 | Tonutti | A01D 78/146 56/377 |
| 2009/0159517 A1 | * | 6/2009 | Rice | B08B 17/00 210/171 |
| 2010/0181418 A1 | * | 7/2010 | Vauchel | B64D 27/18 244/54 |
| 2011/0127371 A1 | * | 6/2011 | Takeuchi | B64D 27/18 244/54 |
| 2011/0192933 A1 | * | 8/2011 | Guering | B64C 15/12 244/54 |
| 2012/0224944 A1 | | 9/2012 | Boulanger et al. | |
| 2016/0082578 A1 | * | 3/2016 | Stepp | B25B 27/023 29/259 |
| 2016/0221693 A1 | * | 8/2016 | Davis | B60P 1/025 |
| 2016/0376015 A1 | * | 12/2016 | Lacko | B64D 29/06 29/888.012 |

* cited by examiner

ENGINE INSTALLATION SYSTEM

BACKGROUND

This invention relates to the assembly of an aircraft, and, more specifically, to a system for installing an engine onto an aircraft.

Assembly of an aircraft is a very complex process. Many of the components of an aircraft are very heavy and very expensive. In addition, the aircraft must be assembled with precision to ensure the parts are not damaged, have proper function, and have long lives. Therefore, specialized tools and fixtures are often used to assist with specific portions of the assembly process. These tools do not end up remaining on the aircraft after assembly is complete, so they are often simple mechanisms with very limited functions.

One example of such a tool is an engine hoist that is used to install the engines of an aircraft. A traditional hoist lifts the engine vertically upward off of a trolley, and positions the engine such that it can be attached to the aircraft. To avoid damaging the parts, no aircraft component can occupy the space through which the engine passes at the time the engine is being moved from the trolley to the final mounting position. Therefore, the certain parts of the engine and/or the aircraft may need to be partially disassembled prior to the mounting of the engine. Such disassembly (and subsequent reassembly) takes time and reduces the efficiency of the aircraft assembly process.

SUMMARY

According to one embodiment of the present invention, an engine installation system includes two aftward members and two forward members. Each member is connected to a different bootstrap on one end and has a pivotable connection to a pylon on the other end. There is a link that connects one forward member with one aftward member, and another link that connects the other forward member with the other aftward member. There is a variable-length member connected to the bootstrap-end of each of the two aftward members, with each of the variable-length members having a pivotable connection to the pylon.

In another embodiment, a system includes a pylon, an engine, a cradle connected to the engine, and a trolley for supporting and positioning the cradle and the engine below the wing. Also included is an engine installation system that is mounted to the pylon and connected to the cradle to vertically move the engine into a preliminary raised position with respect to the pylon. The engine installation system also horizontally moves the engine from the preliminary raised position into a final mounting position with respect to the pylon.

In another embodiment, a method of installing an engine into a pylon of a wing includes attaching an installation system to a pylon and to a cradle that is attached to the engine. The cradle and engine are raised substantially vertically, and the installation system, the cradle, and the engine are moved substantially horizontally aftward to position the engine in a final mounting position with respect to the pylon. Then the engine is attached to the pylon.

DETAILED DESCRIPTION

Figure 1:
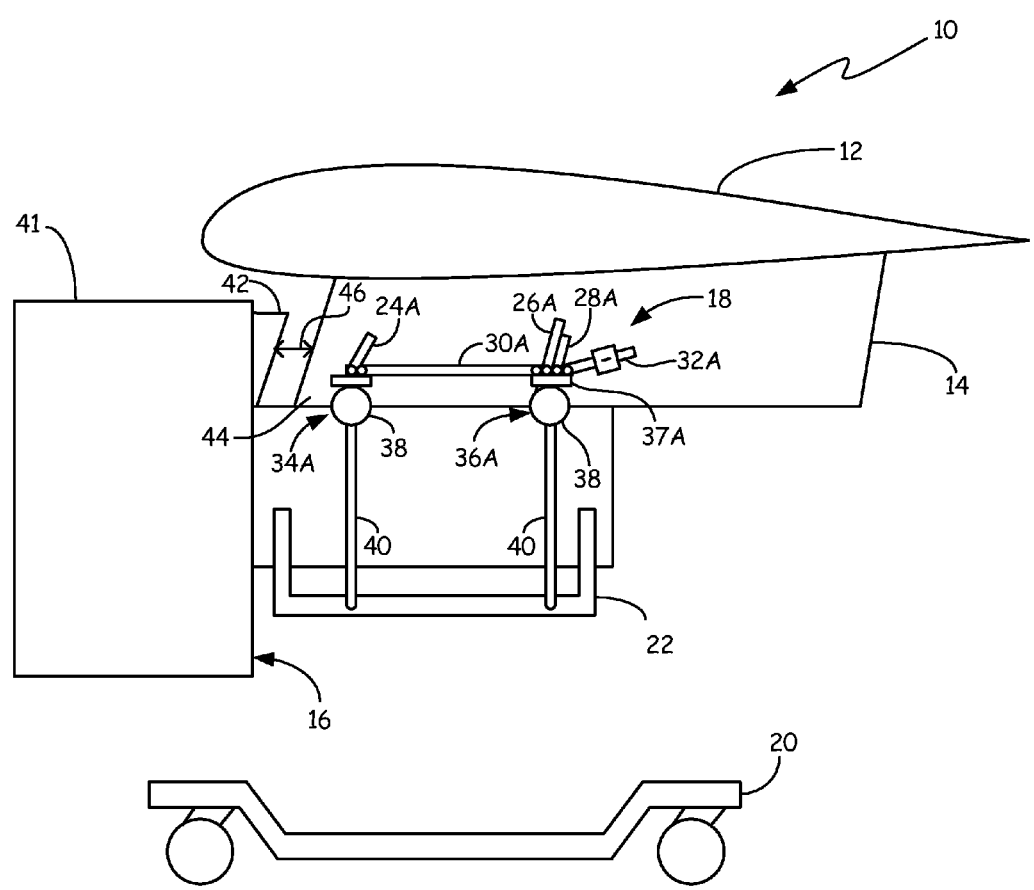
FIG. 1 is a side elevation view of an aircraft system including a wing with a pylon, an engine, and an engine installation system.

In FIG. 1, a side elevation view of aircraft system 10 is shown, including wing 12 with pylon 14, engine 16, and engine installation system 18. Also shown in FIG. 1 are trolley 20 and cradle 22. As will be explained below, aircraft system 10 is shown midway through the process of installing engine 16 on wing 12. In general, engine installation system 18 provides a mechanism to move engine 16 horizontally aftward and forward, which can eliminate or reduce the number of parts requiring disassembly and reassembly during the installation process.

In the illustrated embodiment, pylon 14 generally extends downward from the bottom side of wing 12. Pylon 14 serves as the mounting platform to which engine 16 is attached. During the assembly process engine installation system 18 is attached to pylon 14, albeit at different locations from the final mounting locations (not shown) for engine 16. Also during the assembly process, engine installation system 18 is attached to cradle 22, which is attached to engine 16. Cradle 22 interfaces with trolley 20 such that cradle 22 and engine 16 are moved into position by trolley 20 at the beginning of the assembly process (as shown later in FIG. 5).

In general, engine installation system 18 includes a plurality of members. More specifically, engine installation system 18 includes forward member 24A, upper aftward member 26A, lower aftward member 28A, link 30A, variable-length member 32A, forward bootstrap 34A, and aftward bootstrap 36A. (There is an analogous set of members on the opposite side of pylon 14 that is shown later with respect to FIG. 2A, with each member including the denotation "B" along with the reference number.) One end of each of members 24A, 26A, 28A, and 32A is attached to pylon 14. The other end of forward member 24A is connected to forward bootstrap 34A, and the other ends of upper aftward member 26A, lower aftward member 28A, and variable-length member 32A are connected to aftward bootstrap 36A via knuckle 37A. Link 30A is connected to forward member 24A on one end and to knuckle 37A on the other end. This connects link 30A to upper aftward member 26A, lower aftward member 28A, and variable-length member 32A.

In the illustrated embodiment, forward bootstrap 34A and aftward bootstrap 36A are chain systems that each include chain hoist 38 with chain 40. The ends of chains 40 are attached to cradle 22. The purpose of bootstraps 34A-34B, 36A-36B (with bootstraps 34B-36B shown later in FIG. 2A) is to shorten the distance between cradle 22 and pylon 14, which raises engine 16 into a final mounting position (as shown later in FIG. 5). This is accomplished by chain hoists 38 pulling upwardly on chains 40, respectfully. The force required for this motion can be provided manually by human operators or by a machine, such as an electric motor. Alternatively, chains 40 can be another type of tension member, such as a cable or a steel rope, and chain hoists 38 can be systems that accept such tension members. Furthermore bootstraps 34A-34B, 36A-36B can be another type of lifting mechanism, such as a rack and pinion system.

In FIG. 1, engine installation system 18 is in a forward position. This allows for cradle 22 and engine 16 to be lifted upward off of trolley 20 into a preliminary raised position that is depicted therein. Raising engine into the preliminary raised position is necessary to avoid a collision between engine 16 and pylon 14. More specifically, engine 16 has upper bifurcation 42 that extends aftward from the aft end of fan case 41, and pylon 14 has pylon nose 44 that extends the leading edge of pylon 14 forward. In a vertical direction, upper bifurcation 42 overlaps pylon nose 44. Therefore, gap 46 is necessary between the preliminary raised position and the final mounting position. In a movement that will be described later with respect to FIG. 2B, engine installation system 18 articulates to eliminate gap 46 and moves engine 16 horizontally aftward into the final mounting position with respect to pylon 14.

The components and configuration of aircraft system 10 allow for engine 16 to be moved off of trolley 20, up into the preliminary raised position, and back into the final mounting position. This movement of engine 16 is facilitated by engine installation system 18 and is deliberate, precise, and controlled.

Depicted in FIG. 1 is one embodiment of the present invention, to which there are alternative embodiments. For example, pylon 14 can be attached at another location on an aircraft, such as the rear of the aircraft fuselage, rather than to wing 12.

Figure 2A:
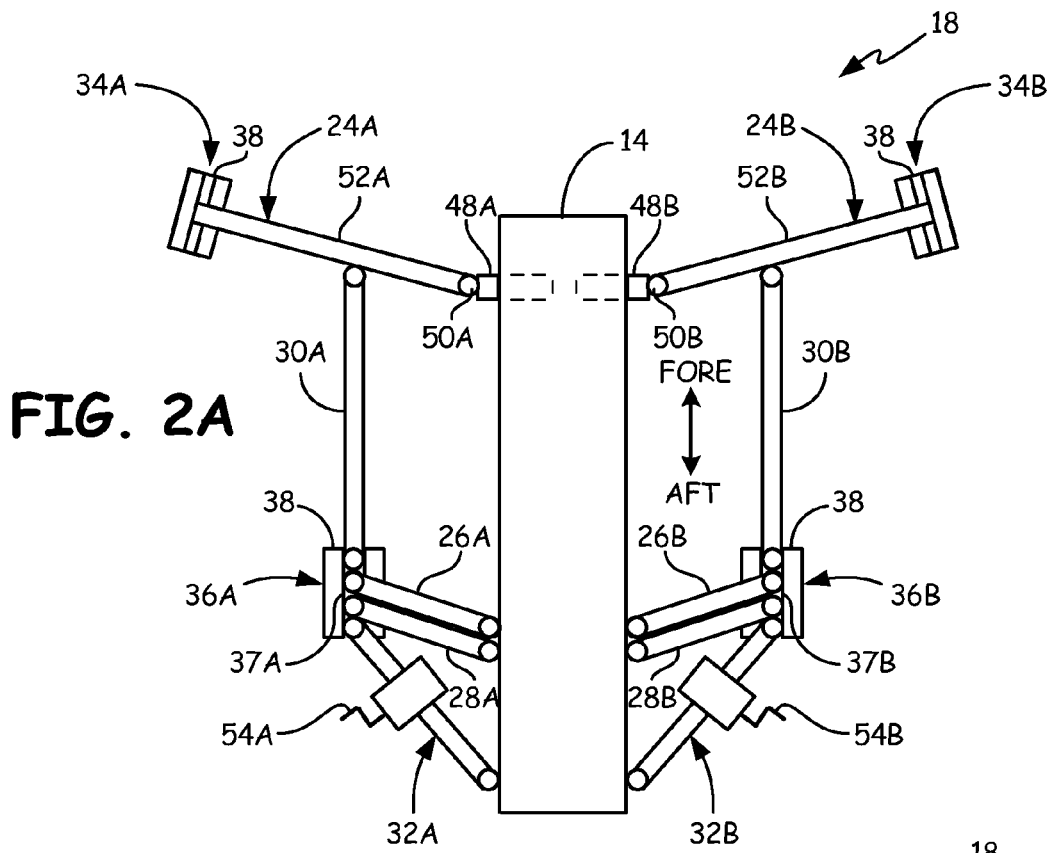
FIG. 2A is a top view of the pylon including the installation system in a forward position.
Figure 2B:
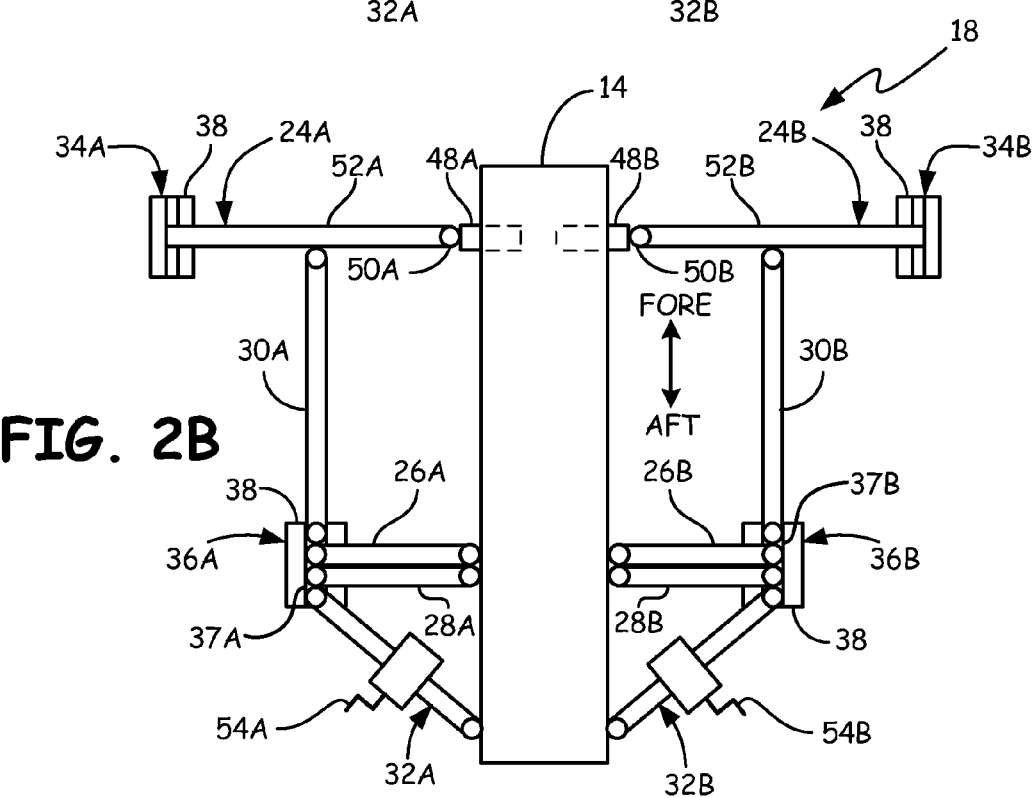
FIG. 2B is a top view of the pylon including the installation system in a neutral position.

In FIG. 2A, a top view of pylon 14 is shown, including engine installation system 18 in a forward position. In FIG. 2B, is a top view of pylon 14 is shown, including engine installation system 18 in a neutral position. From the top vantage point in FIGS. 2A-2B, both the "A" side and the "B" side of engine installation system 18 are visible. FIGS. 2A-2B will now be discussed simultaneously.

In the illustrated embodiment, forward members 24A-24B include mounts 48A-48B, respectively, that are attached to pylon 14. Forward members 24A-24B also include arms 52A-52B, which are rotatably connected to mounts 48A-48B via hinges 50A-50B, respectively. This allows arms 52A-52B to rotate forward and aftward with respect to pylon 14 in a horizontal plane.

Links 30A-30B are connected to arms 52A-52B and also to knuckles 37A-37B, respectively. As stated previously, upper aftward members 26A-26B, lower aftward members 28A-28B, and variable-length members 32A-32B are attached to pylon 14 and to knuckles 37A-37B, respectively. In the illustrated embodiment, these connections include rod end bearings that allow for some relative rotational (i.e. pivotal) movement between the components. Although, other types of pivotable joints that allow for rotational movement can be employed, such as hinges. This allows members 26A-26B, 28A-28B, and 32A-32B to rotate forward and aftward with respect to pylon 14 in a horizontal plane. This moves knuckles 37A-37B forward and aftward with respect to pylon 14 as well. Because knuckles 37A-37B are connected to links 30A-30B, members 26A-26B, 28A-28B, and 32A-32B move horizontal forward and aftward along with forward members 24A-24B (specifically with arms 52A-52B), respectively.

Such horizontal forward and aftward motion of engine installation system 18 is controlled by variable-length members 32A-32B. Variable-length members 32A-32B are components whose lengths can be changed by, for example, manual cranks 54A-54B, respectively. Alternatively cranks 54A-54B can include machine power elements, such as electric motors or fluid power (i.e. hydraulics or pneumatics). When variable-length members 32A-32B are extended, upper aftward members 26A-26B, lower aftward members 28A-28B, links 30A-30B, variable-length members 32A-32B, and knuckles 37A-37B move forward, moving engine installation system 18 to the forward position (as shown in FIG. 2A). When variable-length members 32A-32B are contracted, upper aftward members 26A-26B, lower aftward members 28A-28B, links 30A-30B, variable-length members 32A-32B, and knuckles 37A-37B move aftward, moving engine installation system 18 to the neutral position (as shown in FIG. 2B). In the illustrated embodiment, the distance between the forward position and the neutral position is approximately 15 centimeters (6 inches).

The components and configuration of engine installation system 18 allow for engine installation system 18 to be moved between a forward position and a neutral position. This also allows for cradle 22 and engine 16 (shown in FIG. 1) to be moved aftward from the preliminary raised position to the final mounting position (as shown later in FIG. 5).

Depicted in FIGS. 2A-2B is one embodiment of the present invention, to which there are alternative embodiments. For example, engine installation system 18 can move from the forward position, past the neutral position, to an aftward position to put engine 16 (shown in FIG. 1) in the final mounting position. For another example, engine installation system 18 can raise engine 16 in the neutral position and move to an aftward position for mounting engine 16. For yet another example, engine installation system 18 can raise engine 16 in an aftward position and move forward to put engine 16 in the final mounting position.

Figure 3:
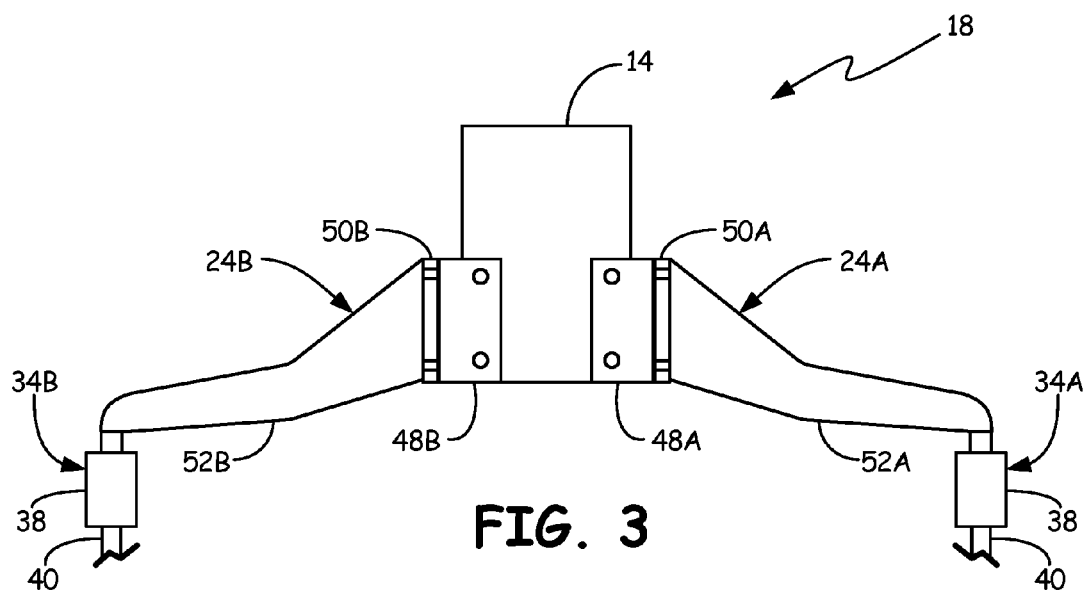
FIG. 3 is a front elevation view of the pylon including two forward members of the installation system.

In FIG. 3, is a front elevation view showing pylon 14 together with forward members 24A-24B of engine installation system 18. In the illustrated embodiment, hinges 50A-50B extend vertically along the edges of mounts 48A-48B, respectively. Arms 52A-52B are cantilevered outward from hinges 50A-50B and are connected to forward bootstraps 34A-34B, respectively. This arrangement transfers the load from engine 16 (shown in FIG. 1) through chains 40 to pylon 14 while allowing engine installation system 18 to move horizontally forward and aftward. As an alternative embodiment, engine installation system 18 can have an upper/lower dual-member arrangement similar to that of upper aftward members 26A-26B and lower aftward members 28A-28B (shown in FIG. 2A). In such an embodiment, the members can include rod end bearings instead of hinges 50A-50B.

Figure 4:
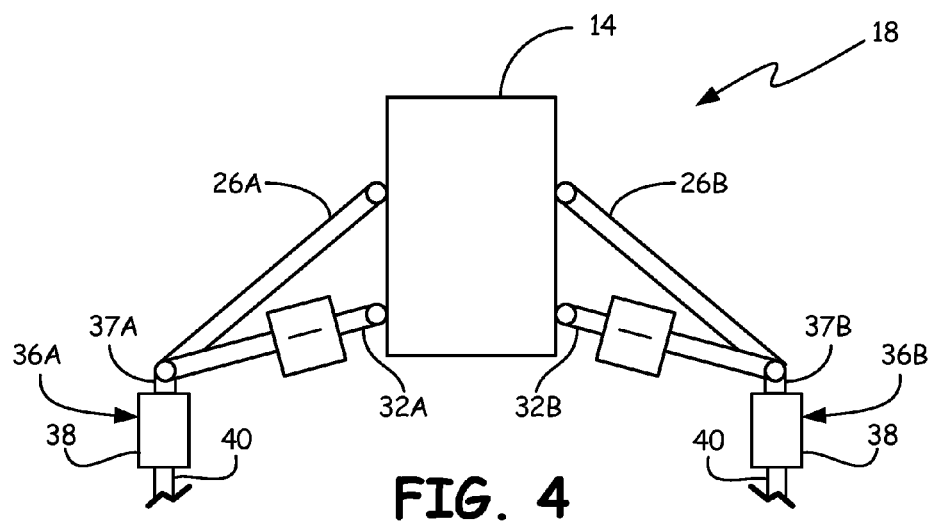
FIG. 4 is an aft elevation view of the pylon including two aftward members and two variable-length members of the installation system.

In FIG. 4, an aft elevation view showing pylon 14 together with upper aftward members 26A-26B and variable-length members 32A-32B of engine installation system 18. In the illustrated embodiment, rod end bearings are at the ends of upper aftward members 26A-26B and variable-length members 32A-32B (as well as lower aftward members 28A-28B, shown in FIG. 2A). Members 26A-26B, 28A-28B, and 32A-32B are also connected to knuckles 37A-37B, respectively, using rod end bearings. Knuckles 37A-37B are connected to aftward bootstraps 36A-36B, respectively. This arrangement transfers the load from engine 16 (shown in FIG. 1) through chains 40 to pylon 14 while allowing engine installation system 18 to move horizontally forward and aftward. As an alternative embodiment, engine installation system 18 can have a mount/vertical hinge/arm arrangement similar to that of forward members 24A-24B (shown in FIG. 3).

Figure 5:
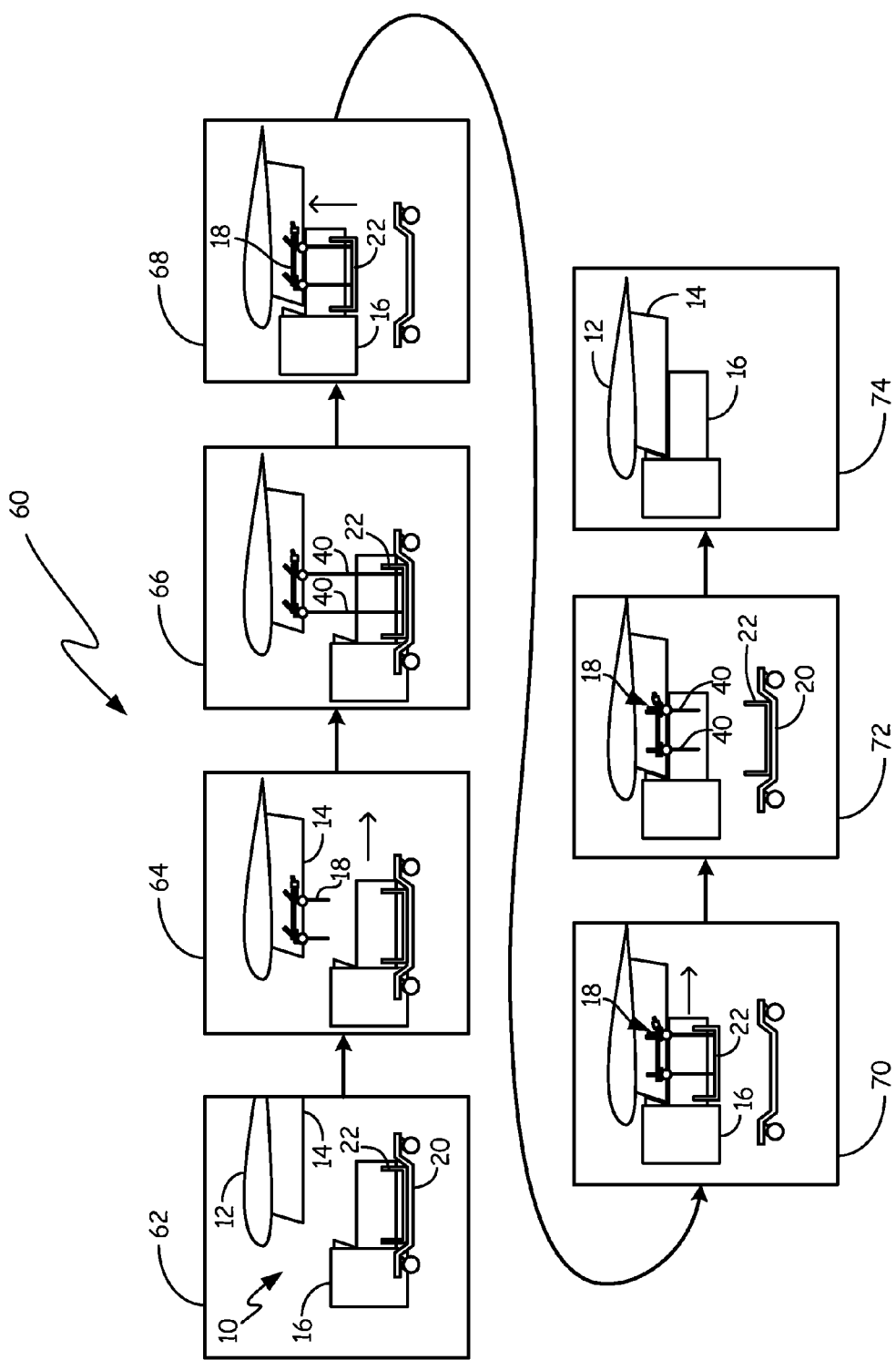
FIG. 5 is a flow chart illustrating a method of installing the engine on the wing.

In FIG. 5, a flow chart illustrating method 60 of installing engine 16 on wing 12 is shown. At step 62, trolley 20 carrying cradle 22 and engine 16 is moved aftward underneath wing 12 and pylon 14. At step 64, engine installation system 18 is attached to pylon 14. At step 66, chains 40 are attached to cradle 22. At step 68, cradle 22 and engine 16 are raised substantially vertically to the preliminary raised position by engine installation system 18 (as also shown in FIG. 1). At step 70, engine installation system 18 is moved to the neutral position, moving cradle 22 and engine 16 substantially horizontally aftward. This movement closes gap 46 between pylon 14 and upper bifurcation 42 (shown in FIG. 1). This movement positions engine 16 in the final mounting position. Also at step 70, engine 16 is attached to pylon 14. At step 72, cradle 22 is detached from engine 16, lowered down onto trolley 20 by engine installation system 18, and detached from chains 40. At step 74, trolley is moved from beneath wing 12 and engine installation system 18 is detached from pylon 14. The steps of method 60 allow for engine 16 to be attached to wing 12 using engine installation system 18.

It will be recognized that the present invention provides numerous benefits and advantages. For example, engine installation system 18 can move engine 16 vertically upward (and downward) as well as horizontally aftward (and forward) in a controlled manner.

Discussion of Possible Embodiments

An engine installation system according to an exemplary embodiment of this disclosure, among other possible things includes: a first bootstrap; a first forward member connected to the first bootstrap at a first end and having a second end for pivotable connection to a pylon; a second bootstrap; a second forward member connected to the second bootstrap at a first end and having a second end for pivotable connection to the pylon; a third bootstrap; a first aftward member connected to the third bootstrap at a first end and having a second end for pivotable connection to the pylon; a fourth bootstrap; a second aftward member connected to the fourth bootstrap at a first end and having a second end for pivotable connection to the pylon; a first link connected to the first forward member and to the first aftward member; a second link connected to the second forward member and to the second aftward member; a first variable-length member connected at a first end to the first aftward member and having a second end for pivotable connection to the pylon; and a second variable-length member connected at a first end to the second aftward member and having a second end for pivotable connection to the pylon.

A further embodiment of the foregoing engine installation system, wherein the first and second bootstraps can comprise a tension member such as a chain or a cable.

A further embodiment of any of the foregoing engine installation systems, wherein each of the variable-length members can comprise a manual crank.

A further embodiment of any of the foregoing engine installation systems, wherein the first member can comprise: an arm connected to the first bootstrap at the first end; a mount connected to the pylon at the second end; and a hinge connecting the arm to the mount that allows the arm pivot with respect to the pylon, the hinge being oriented substantially vertically.

A further embodiment of any of the foregoing engine installation systems, wherein each of the second ends of the aftward and variable-length members can include a rod end bearing.

A further embodiment of any of the foregoing engine installation systems, and further comprising: a third aftward member connected to the third bootstrap at a first end and having a second end for pivotable connection to the pylon; and a fourth aftward member connected to the fourth bootstrap at a first end and having a second end for pivotable connection to the pylon.

A further embodiment of any of the foregoing engine installation systems, and further comprising: a first knuckle that is connected to the third bootstrap and to the first ends of the first and third aftward members; and a second knuckle that is connected to the fourth bootstrap and to the first ends of the second and fourth aftward members.

A system according to an exemplary embodiment of this disclosure, among other possible things includes: a pylon; an engine; a cradle connected to the engine; a trolley for supporting and positioning the cradle and the engine below the wing; and an engine installation system mounted to the pylon and connected to the cradle, to vertically move the engine into a preliminary raised position with respect to the pylon, and to horizontally move the engine from the preliminary raised position into a final mounting position with respect to the pylon.

A further embodiment of the foregoing system, wherein the engine installation system can comprise a plurality of members that articulates to move the engine horizontally into the final mounting position.

A further embodiment of any of the foregoing systems, wherein the engine installation system can comprise a plurality of bootstraps that are connected to the cradle.

A further embodiment of any of the foregoing systems, wherein the engine installation system can comprise: a first bootstrap; a first forward member connected to the first bootstrap at a first end and having a second end for pivotable connection to the pylon; a second bootstrap; a second forward member connected to the second bootstrap at a first end and having a second end for pivotable connection to the pylon; a third bootstrap; a first aftward member connected to the third bootstrap at a first end and having a second end for pivotable connection to the pylon; a fourth bootstrap; a second aftward member connected to the fourth bootstrap at a first end and having a second end for pivotable connection to the pylon; a first link connected to the first forward member and to the first aftward member; a second link connected to the second forward member and to the second aftward member; a first variable-length member connected at a first end to the first aftward member and having a second end for pivotable connection to the pylon; and a second variable-length member connected at a first end to the second aftward member and having a second end for pivotable connection to the pylon.

A further embodiment of any of the foregoing systems, wherein the first and second bootstraps can comprise a tension member such as a chain or a cable.

A further embodiment of any of the foregoing systems, wherein the first member can comprises: an arm connected to the first bootstrap at the first end; a mount connected to the pylon at the second end; and a hinge connecting the arm to the mount that allows the arm pivot with respect to the pylon, the hinge being oriented substantially vertically.

A further embodiment of any of the foregoing systems, wherein each of the second ends of the aftward and variable-length members can include a rod end bearing.

A further embodiment of any of the foregoing systems, wherein the engine installation system further can comprise: a third aftward member connected to the third bootstrap at a first end and having a second end for pivotable connection to the pylon; and a fourth aftward member connected to the fourth bootstrap at a first end and having a second end for pivotable connection to the pylon.

A further embodiment of any of the foregoing systems, wherein the engine installation system further can comprise: a first knuckle that is connected to the third bootstrap and to the first ends of the first and third aftward members; and a second knuckle that is connected to the fourth bootstrap and to the first ends of the second and fourth aftward members.

A method of installing an engine onto a pylon of a wing according to an exemplary embodiment of this disclosure, among other possible things includes: attaching an installation system to a pylon; attaching the installation system to a cradle, the cradle being attached to the engine; raising the cradle and the engine substantially vertically; moving the installation system, the cradle, and the engine substantially horizontally aftward to position the engine in a final mounting position with respect to the pylon; and attaching the engine to the pylon.

A further embodiment of the foregoing method, and further comprising: detaching the cradle from the engine; and detaching the cradle from the installation system.

A further embodiment of any of the foregoing methods, and further comprising: detaching the engine installation system from the pylon.

A further embodiment of any of the foregoing methods, and further comprising: moving a trolley below the wing, the trolley including a cradle that is connected to the engine.

Although the present invention has been described with reference to preferred embodiments, workers skilled in the art will recognize that changes may be made in form and detail without departing from the spirit and scope of the invention.

The invention claimed is:

1. An engine installation system comprising:
   a first bootstrap;
   a first forward member connected to the first bootstrap at a first end and having a second end for pivotable connection to a pylon;
   a second bootstrap;
   a second forward member connected to the second bootstrap at a first end and having a second end for pivotable connection to the pylon;
   a third bootstrap;
   a first aftward member connected to the third bootstrap at a first end and having a second end for pivotable connection to the pylon;
   a fourth bootstrap;
   a second aftward member connected to the fourth bootstrap at a first end and having a second end for pivotable connection to the pylon;
   a first link connected to the second forward member and to the second aftward member;
   a first variable-length member connected at a first end of the first aftward member and having a second end for a pivotable connection to the pylon; and
   a second variable-length member connected at a first end to the second aftward member and having a second end for pivotable connection to the pylon.

2. The engine installation system of claim 1, wherein the first and second bootstraps comprise a tension member such as a chain or a cable.

3. The engine installation system of claim 1, wherein each of the variable-length members comprises a manual crank.

4. The engine installation system of claim 1, wherein the first forward member comprises:
   an arm connected to the first bootstrap at the first end of the first forward member;
   a mount connected to the pylon at the second end of the first forward member; and
   a hinge connecting the arm to the mount that allows the arm to pivot with respect to the pylon, the hinge being oriented substantially vertically.

5. The engine installation system of claim 1, wherein each of the second ends of the aftward and variable-length members includes a rod end bearing.

6. The engine installation system of claim 1, further comprising:
   a third aftward member connected to the third bootstrap at a first end and having a second end for pivotable connection to the pylon; and
   a fourth aftward member connected to the fourth bootstrap at a first end and having a second end for pivotable connection to the pylon.

7. The engine installation system of claim 6, further comprising:
   a first knuckle that is connected to the third bootstrap and to the first ends of the first and third aftward members; and
   a second knuckle that is connected to the fourth bootstrap and to the first ends of the second and further aftward members.

8. A system comprising:
   a pylon;
   an engine;
   a cradle connected to the engine;
   a trolley for supporting and positioning the cradle and the engine below a wing; and
   an engine installation system mounted to the pylon and connected to the cradle, to vertically move the engine into a preliminary raised position with respect to the pylon, and to horizontally move the engine from the preliminary raised position into a final mounting position with respect to the pylon, wherein the engine installation system comprises:
   a first bootstrap;
   a first forward member connected to the first bootstrap at a first end and having a second end for pivotable connection to the pylon;
   a second bootstrap;
   a second forward member connected to the second bootstrap at a first end and having a second end for pivotable connection to the pylon;
   a third bootstrap;
   a first aftward member connected to the third bootstrap at a first end and having a second end for pivotable connection to the pylon;
   a fourth bootstrap;
   a second aftward member connected to the fourth bootstrap at a first end and having a second end for pivotable connection to the pylon;
   a first link connected to the first forward member and to the first aftward member;
   a second link connected to the second forward member and to the second aftward member;
   a first variable-length member connected at a first end to the first award member and having a second end for pivotable connection to the pylon.

9. The system of claim 8, wherein the first and second bootstraps comprise a tension member such as a chain or a cable.

10. The system of claim 8, wherein the first forward member comprises:
    an arm connected to the first bootstrap at the first end of the first forward member;

a mount connected to the pylon at the second end of the first forward member; and a hinge connecting the arm to the mount that allows the arm to pivot with respect to the pylon, the hinge being oriented substantially vertically.

11. The system of claim 8, wherein each of the second ends of the aftward and variable-length members includes a rod end bearing.

12. The system of claim 8, wherein the engine installation system further comprises:

a third aftward member connected to the third bootstrap at a first end and having a second end for pivotable connection to the pylon; and a fourth aftward member connected to the fourth bootstrap at a first end and having a second end for pivotable connection to the pylon.

13. The system of claim 8, wherein the engine installation further comprises:

a first knuckle that is connected to the third bootstrap and to the first ends of the first and third aftward members; and a second knuckle that is connected to the fourth bootstrap and to the first ends of the second and fourth aftward members.

14. A method of installing an engine onto a pylon of a wing using an engine installation system comprising: a first bootstrap, a first forward member connected to the first bootstrap at a first end and having a second end for pivotable connection to a pylon, a second bootstrap, a second forward member connected to the second bootstrap at a first end and having a second end for pivotable connection to the pylon, a third bootstrap, a first aftward member connected to the third bootstrap at a first end and having a second end for pivotable connection to the pylon, a fourth bootstrap, a second aftward member connected to the fourth bootstrap at a first end and having a second end for pivotable connection to the pylon, a first link connected to the second forward member and to the second aftward member, a first variable-length member connected at a first end of the first aftward member and having a second end for a pivotable connection to the pylon, and a second variable-length member connected at a first end to the second aftward member and having a second end for pivotable connection to the pylon; the method comprising:

attaching an installation system to the pylon;

attaching the installation system to a cradle, the cradle being attached to the engine;

raising the cradle and the engine substantially vertically;

moving the installation system, the cradle, and the engine substantially horizontally aftward to position the engine in a final mounting position with respect to the pylon; and attaching the engine to the pylon.

15. The method of claim 14, further comprising:
detaching the cradle from the engine; and
detaching the cradle from the installation system.

16. The method of claim 14, further comprising:
detaching the engine installation system from the pylon.

17. The method of claim 14, further comprising:
moving a trolley below the wing, the trolley including a cradle that is connected to the engine.

* * * * *